(12) United States Patent
Watanabe

(10) Patent No.: US 9,244,719 B2
(45) Date of Patent: Jan. 26, 2016

(54) BATCH PROCESSING SYSTEM

(71) Applicant: Takahiro Watanabe, Tokyo (JP)

(72) Inventor: Takahiro Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 13/789,026

(22) Filed: Mar. 7, 2013

(65) Prior Publication Data

US 2013/0247050 A1    Sep. 19, 2013

(30) Foreign Application Priority Data

Mar. 19, 2012   (JP) .................................. 2012-061389

(51) Int. Cl.
*G06F 9/46* (2006.01)
*G06F 11/34* (2006.01)

(52) U.S. Cl.
CPC .............. *G06F 9/46* (2013.01); *G06F 11/3433* (2013.01); *G06F 11/3485* (2013.01)

(58) Field of Classification Search
USPC ......................................................... 718/101
See application file for complete search history.

(56) References Cited

U.S. PATENT DOCUMENTS

2008/0010497 A1 * 1/2008 Kronlund et al. .................. 714/6
2009/0064142 A1 * 3/2009 Kajita ........................... 718/100

FOREIGN PATENT DOCUMENTS

| JP | H09282192 | A | 10/1997 |
| JP | H10326201 | A | 12/1998 |
| JP | 2004094422 | A | 3/2004 |
| JP | 2010152469 | A | 7/2010 |

OTHER PUBLICATIONS

Japanese Office Action for JP Application No. 2012-061389 mailed on Oct. 13, 2015 with English Translation.

* cited by examiner

*Primary Examiner* — Emerson Puente
*Assistant Examiner* — Steven Do

(57) ABSTRACT

The second computer detects performance of processing to record the execution status of a batch job on a storing device, selects a recording method to be used from among a plurality of recording methods according to the detected performance, and notifies the first computer of the result. The first computer records the execution status of the batch job, executed in the own computer, on the storing device, using the recording method notified from the second computer.

25 Claims, 13 Drawing Sheets

FIG. 2

| JOB IDENTIFIER | RECORD TYPE | STATUS |
|---|---|---|
| 100 | 1 | ACTIVE ,50 |
| ⋮ | ⋮ | ⋮ |

FIG. 4

| JOB ID | JOB NAME | START TIME | END TIME | EXECUTION STATUS | RECORD NO. | SKIP TIMES | JOB REPOSITORY STATUS |
|---|---|---|---|---|---|---|---|
| 1 | job1 | 0:00 | 0:01 | END NORMALLY | 10 | 0 | NORMAL |
| 2 | job2 | 0:01 | | ACTIVE | 50 | 0 | NORMAL |

FIG. 5

| JOB ID | JOB NAME | START TIME | END TIME | EXECUTION STATUS | RECORD NO. | SKIP TIMES | JOB REPOSITORY STATUS |
|---|---|---|---|---|---|---|---|
| 1 | job1 | 0:00 | 0:01 | END NORMALLY | 10 | 0 | NORMAL |
| 2 | job2 | 0:01 | | ACTIVE | 60 | 0 | NORMAL |

FIG. 11

| UPDATE METHOD | APPLIED CONDITIONS |
|---|---|
| (a) BY EACH CHUNK PROCESSING | DB STATE = "NORMAL" OR<br>DB STATE = "DEGENERATE OPERATION" AND JOB EXECUTION TIME WHEN DB FAILURE OCCURES IS M[SEC] OR MORE, OR<br>DB STATE = "DEGENERATE OPERATION" AND JOB REPOSITORY UPDATE PROCESING IS M[TIMES/MIN] OR MORE |
| (b) BY EACH N TIMES OF CHUNK PROCESSING | DB STATE = "DEGENERATE OPERATION" AND CHUNK SIZE IS M OR LESS |
| (c) BY EACH N ITEMS OF PROCESING | DB STATE = "DEGENERATE OPERATION" AND DATA QUANTITY OF ONE ITEM IS M[MB] OR MORE |
| (d) BY A SET OF PROCESSING UNITS | DB STATE = "DEGENERATE OPERATION" AND JOB WAITS FOR A SET OF PROCESSING UNITS |
| (e) BY EACH ERROR | DB STATE = "DEGENERATE OPERATION" |

FIG. 13

| UPDATE METHOD | APPLIED CONDITIONS |
|---|---|
| BY EACH CHUNK PROCESSING | DB STATE = "NORMAL" OR<br>DB STATE = "DEGENERATE OPERATION" AND POSSIBILITY OF OCCURRENCE OF SERVER DOWN IS 10% OR MORE |
| BY EACH ERROR | DB STATE = "DEGENERATE OPERATION" AND POSSIBILITY OF OCCURRENCE OF SERVER DOWN IS LESS THAN 10% |

BATCH PROCESSING SYSTEM

INCORPORATION BY REFERENCE

This application is based upon and claims the benefit of priority from Japanese patent application No. 2012-061389, filed on Mar. 19, 2012, the disclosure of which is incorporated herein in its entirety by reference.

TECHNICAL FIELD

The present invention relates to a batch processing system having a function of executing batch jobs, a batch processing system control method, and a computer.

BACKGROUND ART

Batch processing, which is a type of data processing method of a computer, is a system in which data is gathered for a certain period of time or in a certain quantity and is processed collectively as one job. As a large quantity of data is processed collectively, when the processing is terminated abnormally in the middle of the processing, the cost tends to be higher if the processing is re-executed from the beginning. As such, a system has been proposed and put into practice use, in which an execution status of a batch job is stored in a storing device from time to time, and if the processing is terminated abnormally, the processing is re-executed from the middle of the batch job (for example, see JP 9-282192 A (Patent Document 1)).

In batch processing, the same simple processing is often executed repeatedly. As such, batch processing may be performed in a distributed manner using a plurality of computers (for example, see JP 10-326201 A (Patent Document 2)). Such processing is called distributed batch processing, and a system executing such processing is called a distributed batch processing system. In a distributed batch processing system, execution statuses of a batch job in a plurality of computers are often stored in a storing device which is commonly accessed from the computers.

Patent Document 1: JP 9-282192 A
Patent Document 2: JP 10-326201 A

For a computer executing a batch job, processing to record the execution status of the batch job becomes the overhead. As such, if the processing performance of recording the execution status is degraded due to, for example, a failure of a storing device which stores the execution status of the batch job, the processing time required for the recording becomes longer than expected, whereby the processing time of the batch job becomes longer.

Generally, it is often the case that a large quantity of data must be processed by the deadline in batch processing in order not to affect the operation to be performed after it. As such, if a longer time is required for recording the execution status of the batch job, it is difficult to complete the batch processing by the deadline.

SUMMARY

An exemplary object of the present invention is to provide a batch processing system capable of solving the above-described problem, that is, a problem that if the processing performance to record the execution status of a batch job is degraded, the processing time of the batch job becomes longer.

A batch processing system, according to an exemplary aspect of the present invention, includes a first computer that executes a batch job; a storing device that stores an execution status of the batch job executed in the first computer; and a second computer connected with the first computer and the storing device.

The second computer includes
a detection unit that detects performance of processing to record the execution status of the batch job on the storing device,
a selection unit that, according to the detected performance, selects a recording method to be used by the first computer from among a plurality of types of recording methods for recording the execution status of the batch job on the storing device, and
a notification unit that notifies the first computer of the selected recording method.

The first computer includes
an execution status recording unit that records the execution status of the batch job executed in the own computer on the storing device, using the recording method notified from the second computer.

Further, a batch processing system control method, according to another exemplary aspect of the present invention, is a control method performed by a batch processing system including a first computer that executes a batch job, a storing device that stores an execution status of the batch job executed in the first computer, and a second computer connected with the first computer and the storing device.

The method includes
by the second computer, detecting performance of processing to record an execution status of the batch job on the storing device,
by the second computer, according to the detected performance, selecting a recording method to be used by the first computer from among a plurality of types of recording methods for recording the execution status of the batch job on the storing device,
by the second computer, notifying the first computer of the selected recording method, and
by the first computer, recording the execution status of the batch job executed in the own computer on the storing device, using the recording method notified from the second computer.

Further, a computer, according to another exemplary aspect of the present invention, is connected with a first computer that executes a batch job and a storing device that stores an execution status of the batch job executed in the first computer, and includes
a detection unit that detects performance of processing to record an execution status of the batch job on the storing device,
a selection unit that, according to the detected performance, selects a recording method to be used by the first computer from among a plurality of types of recording methods for recording the execution status of the batch job on the storing device, and
a notification unit that notifies the first computer of the selected recording method.

With the above-described configurations, the present invention is able to prevent the processing time of a batch job from becoming longer even if the processing performance to record the execution status of the batch job is degraded.

BRIEF DESCRIPTION OF DRAWINGS

FIG. 2 is a table showing an exemplary format of recording an execution status of a batch job according to the first exemplary embodiment of the present invention;

FIG. 4 is a table showing exemplary contents at a point of time of a job repository according to a second exemplary embodiment of the present invention;

FIG. 5 is a table showing exemplary contents at another point of time of the job repository according to a second exemplary embodiment of the present invention;

FIG. 11 is a table showing an example of a job repository update policy according to the third exemplary embodiment of the present invention;

FIG. 13 is a table showing another example of a job repository update policy according to the third exemplary embodiment of the present invention.

EXEMPLARY EMBODIMENTS

Next, exemplary embodiments of the present invention will be described in detail with reference to the drawings.

First Exemplary Embodiment

Figure 1:
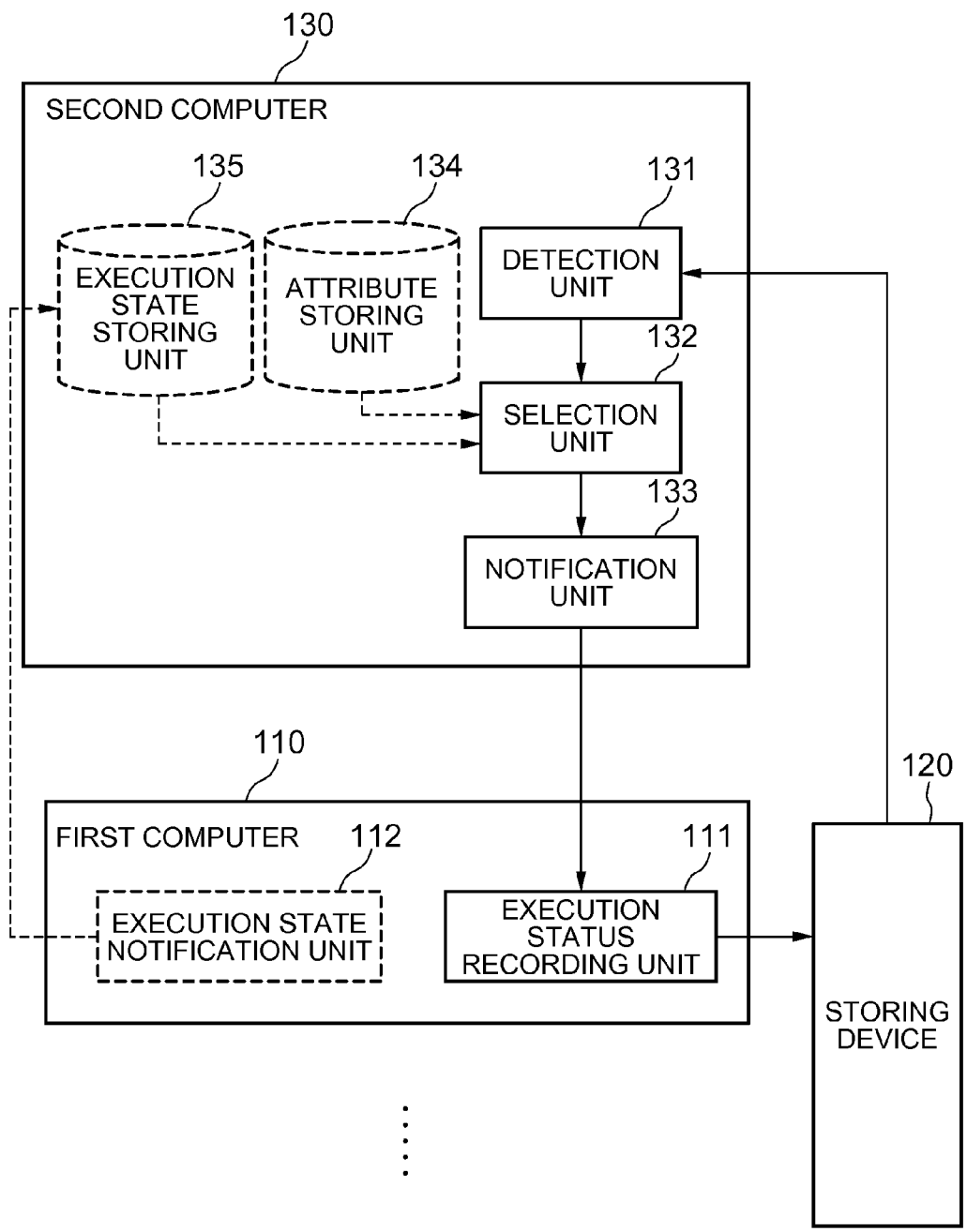
FIG. 1 is a block diagram showing a first exemplary embodiment of the present invention.

Referring to FIG. 1, a batch processing system according to a first exemplary embodiment of the present invention includes one or a plurality of first computers 110 which execute a batch job, a storing device 120 which stores the execution status of the batch job executed by the first computer 110, and a second computer 130 connected with the first computer 110 and the storing device 120.

The second computer 130 has a function of controlling the entire batch processing system. The second computer 130 includes a detection unit 131, a selection unit 132, and a notification unit 133.

The detection unit 131 has a function of detecting a processing performance to record the execution status of a batch job on the storing device 120. Hereinafter, this performance is referred to as an execution status recording performance. For example, if the storing device 120 has a redundant configuration by RAID5 or the like, the I/O performance (throughput, latency, etc.) at the time of degenerate operation by separating one of the disks from the RAID is lowered compared with the case where the RAID operates normally. As such, detecting whether the storing device 120 operates normally or performs degenerate operation corresponds to detecting the execution status recording performance However, the detection unit 131 may detect the execution status recording performance by measuring the I/O performance of the storing device 120 Further, if the first computer 110 is connected with the storing device 120 through a communication path such as a network, performance (throughput, latency, etc.) of the communication path affects the processing time required for the recording. Accordingly, the detection unit 131 may detect the execution status recording performance by detecting whether the communication path is in a normal state or in a congestion state.

The selection unit 132 has a function of selecting a recording method to be used by the first computer, from among a plurality of types of recording methods for recording the execution status of a batch job, according to the execution status recording performance executed by the detection unit 131.

It is desirable that a plurality of types of recording methods for recording the execution status of a batch job are different in access frequency to the storing device 120 from each other. For example, a plurality of types of recording methods may include a recording method in which the execution status of a batch job is recorded on the storing device 120 each time a predetermined unit of processing is completed normally, and a recording method in which the execution status of a batch job is recorded on the storing device 120 only when an error occurs, that is, a recording method having less access frequency than the above-described one. Further, the recording methods may include a recording method in which the execution status of a batch job is recorded on the storing device 120 each time the predetermined unit of processing is completed normally, and a recording method in which the execution status of a batch job is recorded on the storing device 120 each time a unit of processing, which is larger than the above-described predetermined unit, is completed normally, that is, a recording method having less access frequency than that of the above-described one.

When the selection unit 132 selects a recording method from a plurality of types of recording methods according to the execution status recording performance, if the execution status recording performance is further degraded, it is desirable that the selection unit 132 selects a recording method having less access frequency.

The notification unit 133 has a function of notifying the first computer 110 of the recording method selected by the selection unit 132.

The first computer 110 which executes a batch job has an execution status recording unit 111, in addition to the function of executing the batch job.

The execution status recording unit 111 has a function of recording the execution status of a batch job executed in the own computer on the storing device 120, using the recording method notified from the notification unit 133 of the second computer 130.

FIG. 2 shows an example of a record format of the execution status of a batch job. In this example, record information of an execution status corresponding to one batch job is constituted of a job identifier, a record type, and a status. A job identifier is a character string uniquely identifying a batch job. A record type is a character string uniquely identifying a recording method. A status shows an execution status of a batch job, and the content thereof differs depending on the record type. In the case of a recording method in which an execution status of a batch job is recorded each time processing of 10 items of records is completed normally, for example, the status includes a job status constituted of a character string such as "end normally" or "active", and a "record number" showing how many records the processing has completed normally. On the other hand, in a recording method in which an execution status of a batch job is recorded only when an error occurs, the status includes a character string of a job status such as "end abnormally" or "active" and a "record number" showing the record which was end abnormally.

Each of the first computer 110 and the second computer 130 can be configured of computer such as a personal computer having storing units such as a RAM and a hard disk drive, a communication interface for performing data communication with external devices, a computer-readable storing medium configured of a CD-ROM or a magnetic disk storing a program, and a processor such as a CPU connected thereto. The program stored in the computer-readable storing medium is read by the computer when the computer is activated and controls the operation of the computer to thereby realize, on the computer, the execution status recording unit 111 in the case of the first computer 110, while in the case of the second computer 103, the detection unit 131, the selection unit 132, and the notification unit 133.

Figure 3:
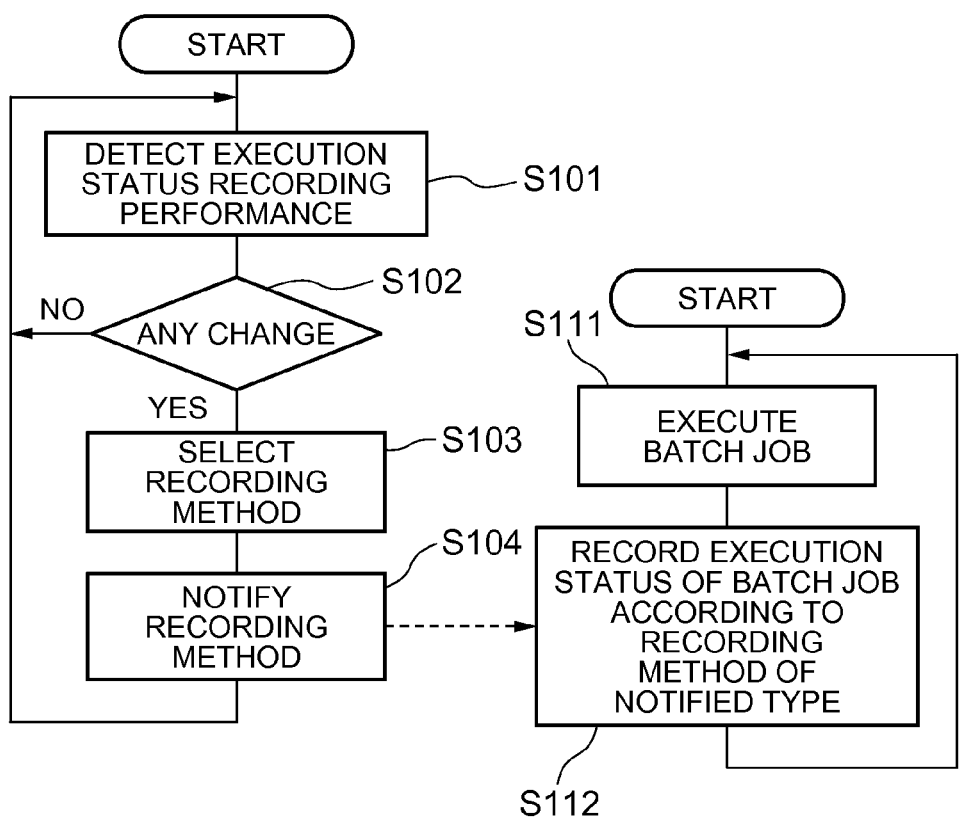
FIG. 3 is a flowchart showing an example of processing according to the first exemplary embodiment of the present invention.

FIG. 3 is a flowchart showing exemplary processing performed by the first and the second computers. Hereinafter, operation of a job processing system according to the present embodiment will be described with reference to FIG. 3.

The detection unit 131 of the second computer 130 cyclically detects execution status recording performance (step S101). The detection unit 131 compares the currently detected execution status recording performance with the previously detected execution status recording performance to thereby determine whether or not the execution status recording performance changes (step S102). If the execution status recording performance does not change, the detection unit 131 returns to step S101 and waits for the next cycle. In contrast, if the execution status recording performance has changed, the detection unit 131 transmits the currently detected execution status recording performance to the selection unit 132.

Based on the execution status recording performance received from the detection unit 131, the selection unit 132 selects a type of a recording method to be used by the first computer 110 from among a plurality of recording methods (step S103). Then, the selection unit 132 transmits the selected type of the recording method to the notification unit 133.

The notification unit 133 notifies the first computer 110 of the type of the recording method received from the selection unit 132 over a network or the like (step S104). Then, control is returned from the notification unit 133 to the detection unit 131, and the detection unit 131 waits for the next cycle.

The first computer 110 executes an input batch job (step S111). Then, the execution status recording unit 111 uses the recording method of the type notified from the second computer 130 to execute processing to record the execution status of the batch job on the storing device 120 (step S112).

For example, if the first computer 110 starts execution of a batch job in a status where it is notified of a recording method of type 1, the first computer 110 uses the recording method of type 1 to start processing to record the execution status of the batch job on the storing device 120. If the recording method is not changed until the batch job is completed, the execution status of the batch job is recorded on the storing device 120 by using only the recording method of type 1. On the other hand, if a recording method of type 2 is notified from the second computer 103 in the middle of execution of the batch job, the first computer 110 changes the recording method from the type 1 to the type 2 in the middle of execution of the batch job.

As described above, according to the present embodiment, even if performance of processing to record the execution status of a batch job deteriorates, it is possible to prevent the processing time of the batch job from becoming longer, because recording is performed by means of a recording method corresponding to the execution status recording performance from among a plurality of types of recording methods. More specifically, if the execution status recording performance further deteriorates, recording is performed using a recording method having less access frequency.

Further, according to the present embodiment, it is possible to return the method to that having more access frequency when the execution status recording performance is recovered.

In the present embodiment, the following additions and modifications can be made.

For example, the second computer 130 may include an attribute storing unit which stores the attribute of a batch job executed by the first computer 110, as shown by a dashed line in FIG. 1. The attribute of a batch job means a quantity of data of one item, and a chunk size which will be described below, for example. If the second computer 130 includes the attribute storing unit 134, the selection unit 132 may select a type of a recording method for each first computer 110, according to the execution status recording performance detected by the detection unit 131 and the attribute of the batch job stored in the attribute storing unit 134.

Meanwhile, the first computer 110 may include an execution state notification unit 112 which notifies the second computer 130 of the execution state of the batch job executed in the own computer, as shown by a dashed line in FIG. 1. The execution state of a batch job means a job execution period of time, the number of accesses to the storing device 120 per unit time, or the like. If the first computer 110 includes the execution state notification unit 112, the second computer 130 may include an execution state storing unit 135 which stores the execution state notified from the first computer 110, as shown by a dotted line in FIG. 1. If the second computer 130 includes the execution state storing unit 135, the selection unit 132 of the second computer 130 may select a recording method for each first computer 110 according to the execution status recording performance detected by the detection unit 131 and the execution state of the batch job stored in the execution state storing unit 135.

Further, the second computer 130 may include the attribute storing unit 134, the execution state storing unit 135, and the execution state notification unit 112, and the selection unit 132 may select a recording method for each first computer 110 according to the execution status recording performance detected by the detection unit 131, the attribute of the batch job stored in the attribute storing unit 134, and the execution state of the batch job stored in the execution state storing unit 135.

Further, while the batch processing system of the present embodiment includes the second computer 130 having a function of detecting execution status recording performance and selecting a recording method separately from the first computer 110 which executes a batch job, it is also possible that the first computer 110, which executes a batch job, includes the above-described functions of the second computer 130.

Second Exemplary Embodiment

Problem to be Solved by Present Embodiment

In execution of batch processing, if the batch processing failed, it is possible to re-execute the processing from the point where the processing failed if information such as an execution state of the batch processing is saved. Hereinafter, one in which an execution status of a job is stored is called a job repository. For example, a job repository is formed such that a table for recording the job execution state is created in the database, and up to what number of items of data the processing is completed is recorded therein in line with the execution of the job.

In the present embodiment, batch processing in which processing is executed sequentially on a data group is assumed. In the batch processing, a number of items of data to be executed sequentially are collectively executed as transaction processing. This collection of data is called a chunk, and the number of items of data included therein is called a chunk size.

Transaction processing means processing which ensures that all multiple operations having mutual dependence are completed or all of them are canceled. Description will be given on the state of operation in the batch processing of the present embodiment. Only when processing of all items of data in one chunk has succeeded, the chunk processing is determined to be successful. If at least one item of data processing in the chunk failed, the chunk processing is determined as a failure, and operation of restoring the state to the state before executing such chunk processing is performed. Update of a job repository, which is processing to store an execution status, is executed each time chunk processing succeeded.

Update of a job repository will be described using FIGS. 4 and 5. The job repository of this example includes, for each batch job, a job ID, a job name, start time, end time, an execution status, a record number, the number of skips, and a job repository status.

FIG. 4 shows an example of a job repository at a point of time. The job repository shows batch job execution statuses of a Job 1 which ended normally and a Job 2 which is active. Here, if the chunk size of the Job 2 is 10, a job repository at the time when processing for one chunk has completed from the point of FIG. 4 is shown in FIG. 5. It is understood that the record number increments by 10 from 50 to 60.

In this way, if the job repository is updated each time chunk processing succeeded, even if the batch processing failed in the middle of the processing, it is possible to re-execute the processing in chunk units from the point after the successful chunks. A method in which a job repository is updated each time chunk processing succeeded has an advantage that a quantity of processing when execution of the job failed so that the processing is re-executed is small. However, it is also has another side that the update frequency of the job repository is high.

Next, distributed batch processing will be described. Distributed batch processing means executing batch processing distributedly using a plurality of computers and processors. In batch processing, there is a case where repetition of simple processing is included. As such, batch processing is suited for distributed processing, and batch processing can be executed efficiently by distributed processing. Processing models of distributed batch processing mainly include the following two forms.

Form in which One Batch Job is Processed Distributedly by a Plurality of Servers This corresponds to the case where one batch job for processing an enormous number of items is processed distributedly by a plurality of servers. In this case, while the execution performance of the batch job becomes higher as the processing is distributed to a larger number of servers, it is desirable to manage the execution states of the batch job together to some extent. This is because in the case of acquiring a status of the entire job or the case of re-executing the job, it is necessary to collect the execution results performed by the respective execution servers, and such information can be acquired faster if they are managed together rather than they are distributed. Accordingly, it is desirable that the execution statuses of the job are managed in an integrated manner.

Further, as one batch job is divided and executed simultaneously, updating of the job repository may be performed at the same time in a plurality of execution servers. As such, there is another aspect that accessing to job repository resources may not be balanced in terms of time.

Form in which a Plurality of Types of Batch Jobs are Processed Distributedly by a Plurality of Servers This is the case where various types of jobs are executed by a plurality of servers. Even in the same job, a case where different parameters (e.g., chunk size) are given at the time of execution corresponds to this form.

Figure 6:
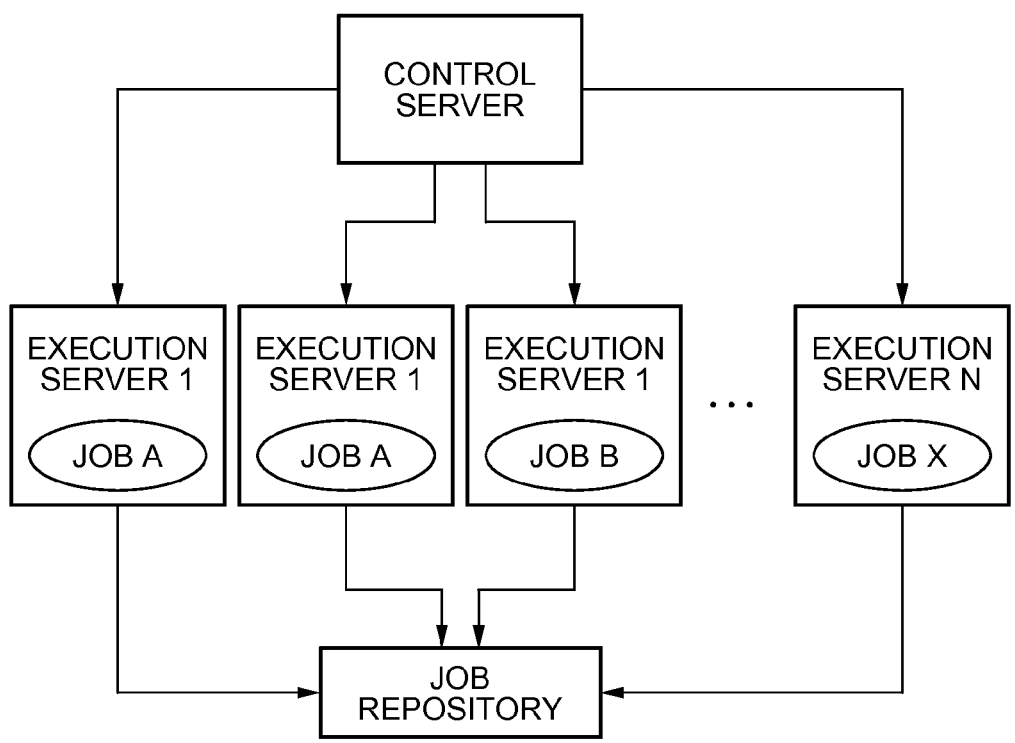
FIG. 6 is a schematic diagram showing distributed batch processing which is the premise of the second exemplary embodiment of the present invention.

FIG. 6 shows a schematic diagram of distributed batch processing. As the present embodiment relates to a system in which an execution status of a job is stored in a job repository, a job repository is described. The job repository is stored in a single resource or in a plurality of resources distributedly.

Here, consideration will be given on the case where the update performance of a job repository is degraded in distributed batch processing. Due to degradation of the update performance of the job repository, job repository update processing by an enormous number of execution servers may become a bottleneck, so that the performance of the entire batch job may be degraded. As such, it is necessary to take some countermeasures. However, as it is desirable that the execution statuses of the job are managed in an integrated manner because of the reason described in the first item above, it is not preferable to simply add a resource for the job repository when the updating performance of the job repository is degraded.

Overview of Present Embodiment

As described above, it is not preferable to simply add a resource for the job repository when the update performance of the job repository is degraded. As such, the present embodiment introduces a job repository update method in which the load is reduced at the time of degradation of the performance of the job repository by means of reducing the number of updates in the job repository, reducing the quantity of data to be updated, or the like.

To be specific, while the job repository is updated each time chunk processing succeeded in general, if the performance of the job repository is degraded, the method is changed to one in which update is performed only when the processing failed. Thereby, the update frequency of the job repository can be reduced, whereby an effect caused by degradation of the performance of the job repository can be reduced.

Figure 7:
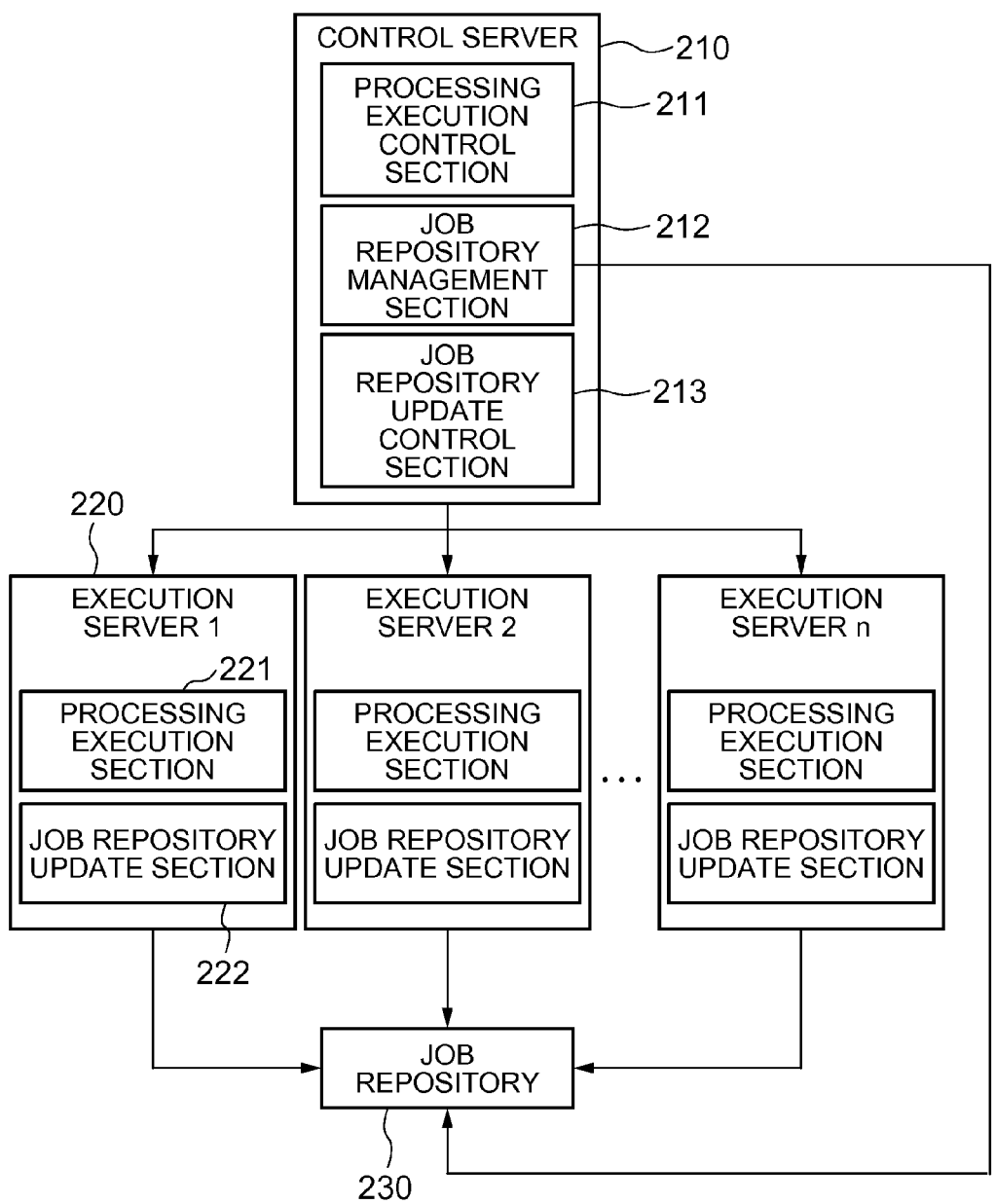
FIG. 7 is a block diagram showing the overview of the entire system according to the second exemplary embodiment of the present invention.

First, with use of FIG. 7 showing the simplified configuration of the entire system of the present embodiment, description will be given on the outline of the configuration of reducing the effect caused by degradation of the update performance of the job repository by changing the job repository update method when the update performance of the job repository is degraded in the distributed batch processing.

A control server 210 allocates a batch job to respective execution servers 220. In general, as shown in FIGS. 4 and 5, a job execution status is stored, that is, a job repository is updated, at the time when processing of each chunk ends normally.

Here, the case where the performance of job repository update processing is degraded will be considered. As described above, in a general state, a job repository is updated each time processing of each chunk ends normally. When the job repository update performance is degraded, the method is changed to one in which the job repository is updated only when an error occurs in the chunk processing. For example, if processing of three chunks has completed normally and an error occurs in the middle of the processing of the fourth chunk, three times of accesses are made to the job repository in the method used in a general state. However, only one access is made in the method of updating the job repository only when an error occurs.

In the method of updating the job repository only when an error occurs, the contents of the job repository in FIGS. 4 and 5 are changed such that the job repository status is changed from "normal" to "abnormal" or "degenerate operation", and the record number shows the record number in which the processing failed. The recording format is the same before and after the change of the recording method. In this way, it is possible to reduce accesses to the DB for the job repository while maintaining the data location where the processing failed. Thereby, it is possible to reduce the effect caused by degradation of the job repository update performance.

Configuration of Present Embodiment

The configuration of the present embodiment will be described in detail with reference to FIG. 8.

Figure 8:
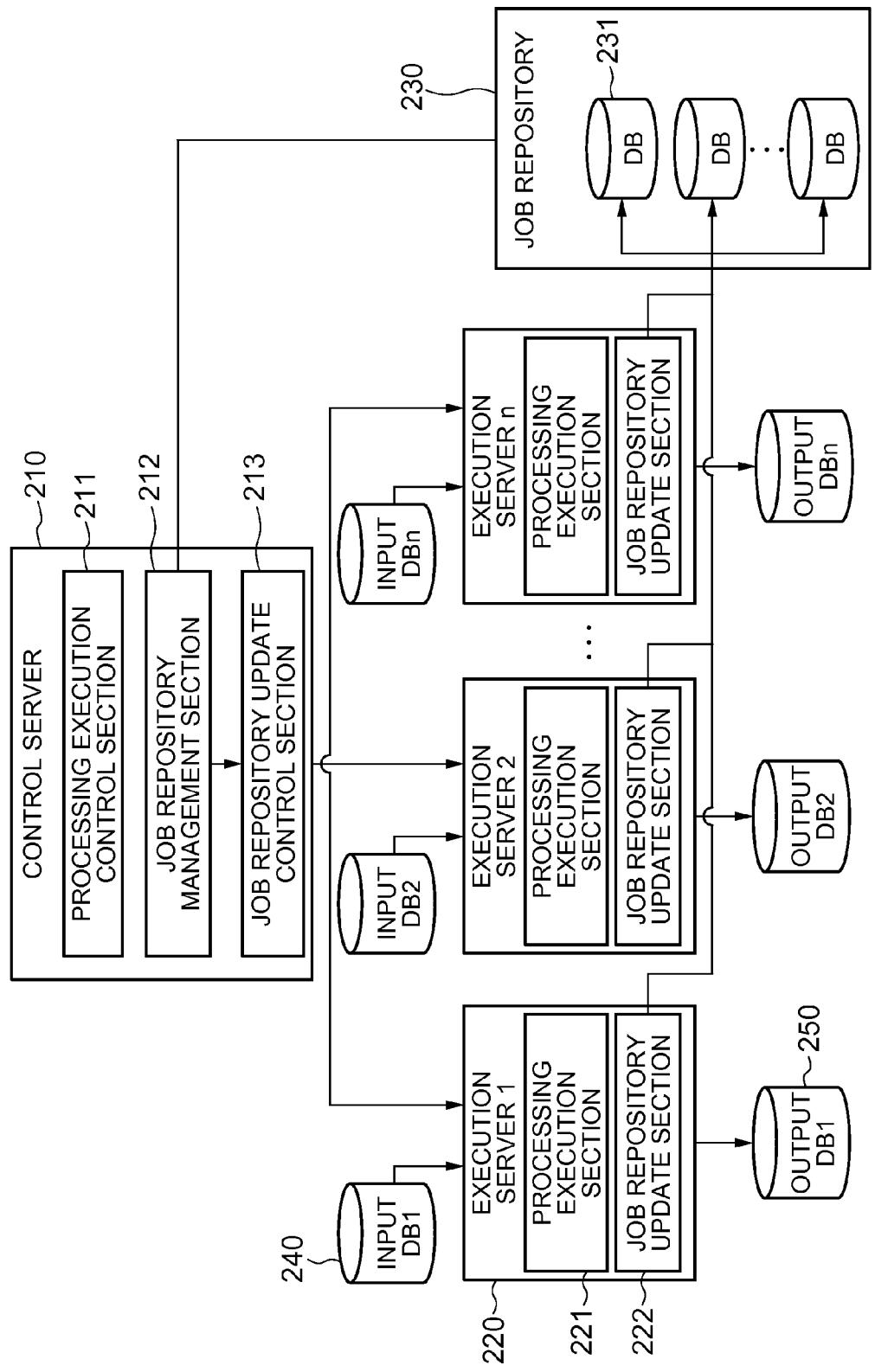
FIG. 8 is a block diagram showing the second exemplary embodiment of the present invention.

Referring to FIG. 8, the present embodiment includes a control server 210 which controls distributed batch processing, a plurality of execution servers 220 (execution server group) which are controlled by the control server 210 to execute respective pieces of batch processing, and a job repository 230.

The control server 210 includes a processing execution control section 211, a job repository management section 212, and a job repository update control section 213. The processing execution control section 211 allocates a batch processing group, required to be processed, to the respective execution server 220, and controls execution. The job repository management section 212 monitors whether the resources for the job repository operate normally, and manages the contents of the job repository. The job repository update control section 213 instructs a job repository update section 222 of the execution server 220 to change the job repository update method (recording method).

Each of the execution servers 220 includes a processing execution section 221 and a job repository update section 222. The processing execution section 221 executes a batch job. Here, a DB 240 for inputting and a DB 250 for outputting a result are described as examples. The job repository update section 222 updates the job repository 230 in line with execution of a batch job. For this, a job repository constituted of a plurality of DBs 231 is described as an example. As such, the job repository 231 is configured of a group of resources for the job repository.

Operation of Present Embodiment

Figure 9:
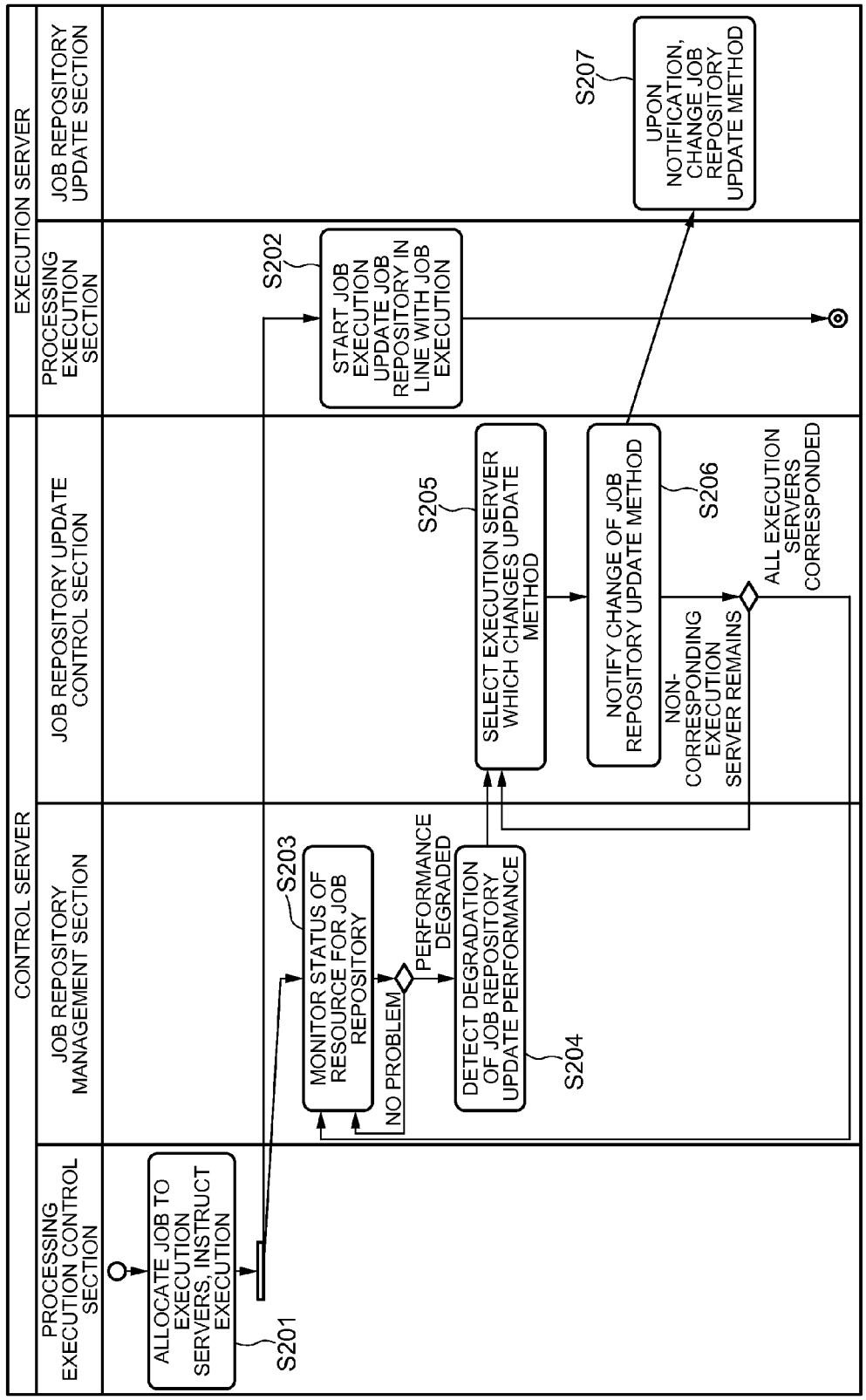
FIG. 9 is a flowchart showing the flow of changing a job repository update method when the job repository update performance is degraded in the second exemplary embodiment of the present invention.

Operation of the present embodiment will be described with reference to the flowchart of FIG. 9.

First, the processing execution control section 211 of the control server 210 allocates the jobs to the respective execution servers and instructs execution (step S201).

Next, upon receipt of the instruction, the processing execution section 221 of each execution server 220 starts job execution (step S202). Each execution server 220 updates the job repository in line with the execution of the job, and stores the job execution state.

When the job is started, the job repository management section 212 of the control server 210 monitors statuses of the resources for the job repository (step 203). Then, when the job repository management section 212 detects that the job repository update performance is degraded, the job repository management section 212 instructs the job repository update control section 213 to start job repository method changing processing (step S204).

The job repository update control section 213 of the control server 210 first selects one execution server 220 which changes the update method (step S205). Next, the job repository update control section 213 notifies the selected execution server 220 of a change of the job repository update method (step S206). The job repository update control section 213 repeats the processing of steps S205 and S206 until an instruction to change the job repository update method is made to all of the execution servers 220.

Upon receipt of the notification from the job repository update control section 213, the job repository update section 222 of each execution server 220 changes the job repository update method (step S207). The subsequent job repository update processing relating to the job execution is performed using the changed method.

Effects of Present Embodiment

A first advantageous effect is that an adverse effect due to performance degradation can be reduced by changing the job repository update method performed by each execution server when the update processing performance of the resources for the job repository in the execution basis of the distributed batch processing is degraded.

The effect achieved by changing the job repository update method of the present embodiment will be described below with examples.

An assumption of specific examples will be given below. It is assumed that there are 100 units of execution servers 220 with respect to one control server 210. Data of one job is divided in to 100 pieces, each of which is executed by each of the execution servers 220. The chunk size is the same for every server 220. A period of time taken for execution of one chunk is 5 seconds, and each of the execution servers 220 performs processing of 10000 chunks.

The following two cases are assumed.

Case A:

All execution servers update a job repository by means of a method of updating the job repository each time processing of each chunk ends normally, from the start to the end of the job.

Case B:

All execution servers update a job repository by means of a method of updating the job repository only when processing of each chunk failed, from the start to the end of the job, provided that when the job ends normally, the job repository is updated to record the fact.

Further, it is assumed that it takes 0.1 second for performing update of the job repository by one execution server 220. It is assumed that no error will occur in the job processing itself executed on each execution server 220. In this case, an average processing time per one server until completion of the processing, calculated for each of the cases A and B, is as follows.

Case A:

Chunk processing and job repository update processing are repeated 10000 times. In the following expression, as an average processing time per one unit of server is calculated, the result is divided by 100 (units).

$$((5[s]+0.1[s])*10000[chunk])*100[unit]/100[unit]=51000[sec]$$

Case B:

In this case, as no error occurs in the job processing it self, the job repository update processing is only once when the processing ends. As such, each execution server performs chunk processing 10000 times and performs job repository updating once when the job ends.

$(5[s]*10000[\text{chunk}]+0.1[s])*100[\text{unit}]/100[\text{unit}]$
$50000[\text{sec}]$ In these examples, regarding the average processing time per one unit of server, it is found that in the method of Case B, the processing time is shorter by 1000 second, compared with the result of Case A. As such, it is understood that by changing the method from the method of executing update each time processing of each chunk ends normally to the method of executing update only when processing of each chunk failed when the job repository update performance is degraded, an adverse effect due to degradation of the job repository update performance can be reduced.

Third Exemplary Embodiment

In the present embodiment, when the job repository update performance is degraded, a job repository update method is determined according to the job repository update method determination policy based on the attribute of the job being executed for each of the execution servers 220, rather than simply changing the job repository update method of the every execution server 220 to the method of executing update only when an error occurs as in the second exemplary embodiment. Thereby, it is possible to apply a job repository update method appropriate for each job being executed.

Figure 10:
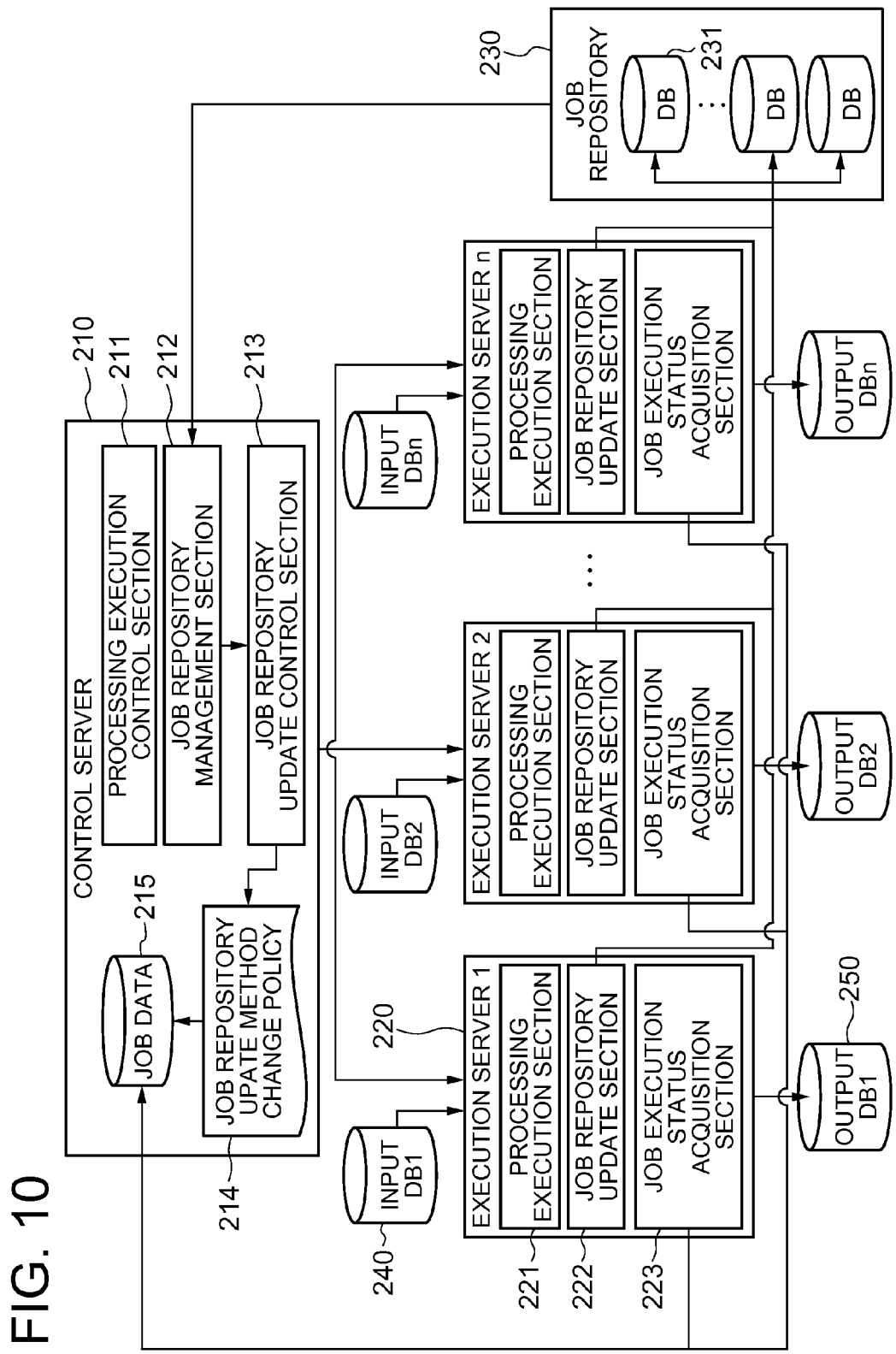
FIG. 10 is a block diagram showing a third exemplary embodiment of the present invention.

As such, in the present embodiment, some changes are made to the configuration of the second exemplary embodiment, as shown in FIG. 10. First, in the control server 210, a job repository update method change policy 214 and job data 215 are added, and in each of the execution servers 220, a job execution status acquisition section 223, for acquiring dynamic information to be used for determining a job repository update method, is added. Hereinafter, detailed description of the present embodiment will be given.

In the second embodiment, a method is changed so as to update a job repository only when an error occurs at the time of executing a batch job. However, in the method of updating a job repository only when an error occurs at the time of executing a batch job, there is a possibility that the job repository will not be updated even if an error occurs, such as the case where the batch job execution process failed. In that case, if every data is processed normally without any error in that execution server 220, information of to what point the batch job having been executed is not recorded, so when re-executing the batch job, it is necessary to start processing again from the first piece of the data.

As such, reducing an adverse effect due to degradation of the job repository update performance and reducing the cost involved in re-execution of the job are in a trade-off relation.

The jobs provided below are cases in which it is inappropriate to adopt a method of updating the job repository only when an error occurs because of a reason that the cost involved in re-execution of the job is large, for example.
(1) A Batch Job in Which Cost for Re-Executing an Assigned Batch Job from the Beginning is High.

Although it is necessary to re-execute a batch job assigned to the execution server 220 from the beginning, the cost for re-execution is very high because the data to be handled is enormous.

(2) A Batch Job Requiring High Reliability

Although a batch job assigned to the execution server 220 should be re-executed from the beginning, the batch job requires highly reliable status management because there is a batch job which cannot be executed twice or more, for example.
(3) A Batch Job of Long Execution Time If the execution server 220 goes down, it is necessary to re-execute the batch job assigned to the execution server 220 from the beginning. However, in the case of the batch job taking a lone execution time, such a long execution time is needed again. As such, for a batch job which has taken a long execution time at the point when the job repository update performance is degraded, it is desirable to operate the system in such a manner as to prevent execution of the job again from the beginning by updating the job repository each time chunk processing succeeded even after the occurrence of a failure.
(4) Batch Job in Which the Number of Job Repository Update Times Per Unit Time is Small In the case of a batch job in which the number of job repository update times per unit time is small, as the load placed on the DBs for the job repository is small originally, there is a possibility that the update method is not needed to be changed even when a failure occurs in the DBs.
(5) Batch Job Having High Possibility of Abnormal Termination An example thereof is a job having a high possibility of abnormal termination because "the number of skips" is large, or the like. As a main reason for updating the job repository is to prepare for re-execution due to an error, for a batch job having a high possibility of abnormal termination, it is desirable to perform update of the job repository in a reliable manner.

As described above, while there is a job in which the frequency of job repository update should be reduced in order to prevent degradation of the performance on one hand, on the other hand, there is also a job in which the cost involved at the time of re-execution should be reduced. Accordingly, in the present embodiment, a plurality of job repository update methods are prepared, and an application policy for each of the update method is defined. Hereinafter, examples of job repository update methods will be shown.

(a) Update each time one unit of chunk processing ends (update method in a normal state in the second exemplary embodiment).

(b) Update each time a certain number (2 or more) of units of chunk processing ends.

(c) Update each time processing of a certain number of pieces ends.

(d) Update each time a set of processing ends (when a set of processing such as a sub job A→a sub job B→a sub job C ends)

(e) Update only when an error occurs (update method to be adopted when the job repository update performance is degraded in the second exemplary embodiment).

Further, examples of attributes of a job to be used for the job repository update method determination policy will be shown below. In parentheses, whether the attribute of the job is determined before job execution (static) or whether it is determined in the course of job execution (dynamic) is noted.

(i) Data quantity of one item (static data)
(ii) Chunk size (static data)
(iii) Whether a job waits for a set of processing (static data)
(iv) Possibility of server down (static data)
(v) Job execution time (dynamic data)
(vi) The number of job repository update times per unit time (dynamic data)

The job repository update method change policy 214 defines an indication of a change of a job repository update method. FIG. 11 shows an example of an update policy 214. In this example, the job repository update policy 214 has five entries. Each entry has an update method and applied conditions thereof. In the field of update method, any one of the above-described five types of update methods (a) to (e) is described. In the field of applied conditions, conditions for adopting the corresponding update method are described. Applicability is determined sequentially from the top entry, and an update method satisfying the applied condition first is used.

For example, if the DB status of the job repository 230 is normal, an update method of (a) is used. If the DB status of the job repository 230 is degenerate operation and the job execution time at the time when the DB failure occurs is m or more or the job repository update processing is m [times/min] or more, an update method of (a) is used as well. However, even in the case of degenerate operation, if the job execution time at the time when the DB failure occurs is not m or more or the job repository update processing is not m [times/min] or more, then it is determined whether the chunk size is m or less, and if so, an update method of (b) is used. If the chunk size is not m or less, it is further determined whether the data quantity of one item is m [MB] or more. If so, an update method of (c) is used. Meanwhile, if the data quantity of one item is less than m [MB], an update method of (d) is used if the job waits for a set of processing units, while if not, an update method of (e) is used.

Configuration of Present Embodiment

Referring to FIG. 10, the present embodiment is different from the configuration of the first exemplary embodiment shown in FIG. 8 in that the control server 210 includes a job repository update method change policy 214 and job data 215, and each execution server 220 includes a job execution status acquisition section 223 for acquiring dynamic information to be used for determining a job repository update method.

The job execution status acquisition section 223 of the execution server 220 has a function of periodically transmitting, to the control server 210, dynamic job data to be used by the job repository update method change policy 214 at the time of job execution. It should be noted that static job data has been present in the job data 215.

If the job repository update performance is degraded, the job repository update control section 213 of the control server 210 refers to the stored job data 215, to determine a job repository update method based on the job repository update method change policy 214.

Operation of Present Embodiment

Figure 12:
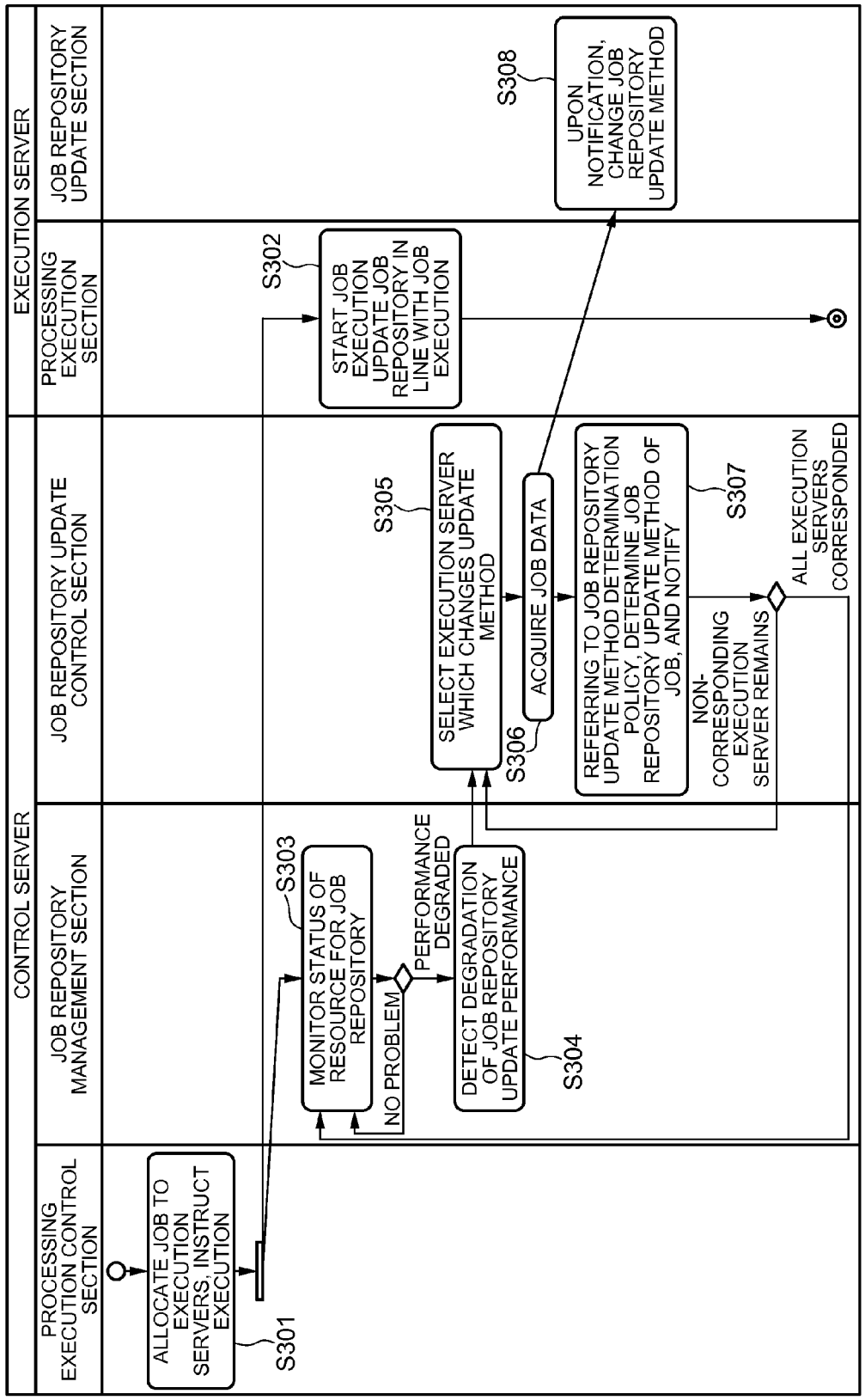
FIG. 12 is a flowchart showing the flow of changing a job repository update method when the job repository update performance is degraded in the third exemplary embodiment of the present invention.

Operation of the present embodiment will be described with reference to the flowchart of FIG. 12.

First, the processing execution control section 211 of the control server 210 allocates a job to each of the execution servers 220, and instructs execution (step S301).

Next, upon receipt of the instruction, the processing execution section 221 of each execution server 220 starts job execution (step S302). Each execution server 220 updates the job repository in line with the execution of the job, and stores the execution state of the job. Further, each execution server 220 acquires dynamic job data to be used for determining a job repository update method, and transmits it to the control server 210.

When the job begins, the job repository management section 212 of the control server 210 monitors the status of the resources for the job repository (step S303). Then, if the job repository management section 212 detects degradation of the job repository update performance, the job repository management section 212 instructs the job repository update control section 213 so as to start job repository update method change processing (step S304).

The job repository update control section 213 of the control server 210 first selects one of the execution server 220 which changes the update method (step S305). Next, the job repository update control section 213 acquires static job data and dynamic job data related to the job of the selected execution server 220, from the job data 215 (step S306). Then, based on the acquired job data, the job repository update control section 213 checks which applied condition of an update method of the job repository update policy the batch job executed by the execution server 220 satisfies, and determines an update method (step S307). Then, the job repository update control section 213 notifies the selected execution server 220 of a change of the job repository update method. The job repository update control section 213 repeats the processing of steps S305 to S307 until it instructs all of the execution servers 220 to change the job repository update method.

Upon receipt of the notification from the job repository update control section 213, the job repository update section 222 of each execution serve 220 changes the job repository update method to the notified method (step S308).

Effects of Present Embodiment

According to the present embodiments, in addition to the advantageous effects which are the same as those of the second exemplary embodiment, the following advantageous effects can be achieved.

By using information of active batch job as a determination material for job depository update method determination for each of the execution servers 220, it is possible to realize flexible operation in which reduction of the adverse effect due to degradation of the job repository update performance and the cost involved in job re-execution are balanced.

Further, by using information relating to execution of the batch job obtained dynamically from the processing result of the active batch as a material for determining a job depository update method for each of the execution servers 220, it is possible to realize more flexible operation. Specific description will be given. Regarding any of the execution servers 220, there is job information which can be obtained only after the job is executed, including, an unexpected increase of job execution time because the expected speed is not realized, or as a result of executing a job without checking input data in advance, a number of flaws are found in the input data when being executed. The present embodiment uses such dynamic information to thereby realize highly flexible operation.

Hereinafter, advantageous effects of using the present embodiment will be described with examples. The assumption of specific examples will be given below.

It is assumed that there are 100 units of execution servers 220 with respect to one control server 210. Data of one job is divided into 100 pieces, each of which is executed by each of the execution servers 220. The chunk size is the same for every server 220. A period of time taken for execution of one chunk is 5 seconds, and each of the execution servers 220 performs processing of 10000 chunks.

The following three cases are assumed.

Case A:
All execution servers update a job repository by means of a method of updating the job repository each time processing of each chunk ends normally, from the start to the end of the job.

Case B:
All execution servers update a job repository by means of a method of updating the job repository only when processing of each chunk failed, from the start to the end of the job.

Case C:
All execution servers update a job repository by means of a method appropriate for each execution server, from the start to the end of the job (that is, a method of the present embodiment).

Here, an update method appropriate for each execution server in the case C will be described by simplifying it as shown in FIG. 13. It is assumed that if the DB state of the job repository 230 is normal, or the DB state of the job repository 230 is in degenerate operation and a possibility of occurrence of server down, until the entire processing assigned to the execution server is executed, is 10 percent or higher statistically, an update method of (a) in FIG. 11 is used, while an update method of (e) is used in other cases.

Further, it is assumed that it takes 0.1 second for performing update of the job repository 230 once by one execution server 220. Further, among 100 units of servers, it is assumed that 50 units of servers are down with a 100 percent probability immediately before completion of the processing of the $10000^{th}$ chunk so that the job execution process fails. The failed servers and the job execution process will be restored immediately, and the time required for restoration is 0 [sec]. Further, it is assumed that no error will occur in the job processing itself executed on each execution server 220. In this case, an average processing time per one server until completion of the processing, calculated for each of the cases A, B, and C, is as follows.

Case A:
Chunk processing and job repository update processing are repeated 10000 times. Although 50 units of servers are down in the middle of the processing of the $10000^{th}$ chunk, they are restored immediately and the processing is resumed from the $10000^{th}$ chunk.

$$((5[s]+0.1[s])*10000[chunk]*50[unit])+(5[s]+0.1[s])*10001[chunk]*50[unit]))/100[unit]$$
$$\approx 51002[sec]$$

Case B:
In this case, as no error occurs in the job processing itself, the job repository update processing is performed only once when the processing ends. For the servers which are not down, 10000 times of chunk processing and one job repository update at the time when the job ends are performed. Regarding the failed servers, as no execution information is stored at the time when they are down immediately before the processing of the $10000^{th}$ chunk, it is necessary to re-execute the 10000 chunks, so that 20000 chunks in total are executed.

$$((5[s]*10000[chunk]+0.1[s])*50[unit]+(5[s]*20000[chunk]+0.1[s])*50[unit]))/100[unit]75000[sec]$$

Case C:
For the servers which are not down, 10000 times of chunk processing and one job repository update at the time when the job ends are performed. Regarding the failed servers, as they are down at a 100 percent probability immediately before completion of the processing of the $10000^{th}$ chunk, the failure rate is 10 percent or higher. As such, an update method of (a) will be used. When it is restored, as it is possible to resume the processing from the $10000^{th}$ chunk, the chunk processing and job repository update processing are repeated 10001 times.

$$((5[s]*10000[chunk]+0.1[s])*50[unit]+(5[s]+0.1[s])*10001[chunk]*50[unit]))/100[unit]$$
$$50500[sec]$$

In these examples, regarding the average processing time per one server, it is found that the processing time of Case B is 25000 seconds longer and the processing time of Case C is 500 seconds shorter, compared with the result of Case A. In general, as the number of job repository update times in Case B is reduced compared with Case A, the processing time must be reduced. However, in the case of server down as in this example, it is necessary to re-execute the processing from the beginning, so that the processing time may be increased.

On the other hand, in Case C, as an update method corresponding to the execution server is used, the processing time is reduced successfully. As such, by using the present embodiment when the job repository update performance is degraded, it is possible to realize flexible operation in which reduction of the adverse effect due to degradation of the job repository update performance and the cost involved in job re-execution are balanced.

As described above, the present embodiment is able to provide a control device and a control system considering performance degradation of execution state storing processing of a batch job in the base of the batch job distributed execution.

Further according to the present embodiment, when the execution state of each job is stored in the base of the batch processing distributed execution, when the performance of the execution state storing processing is degraded, the execution state storing method is changed to a method in which accesses to the resources for storing are reduced. Thereby, it is possible to provide a system in which the adverse effect due to performance degradation of the execution state storing processing placed on the entire batch processing is reduced.

Further, according to the present embodiment, it is possible to provide a system having a section which determines what change should be applied based on the characteristics of the job and the information obtained through execution of the job relating to a change of the execution state storing method when the performance is degraded, which enables to control the balance between the performance of batch processing execution and the reliability.

The present invention is suitable for a batch processing system having a function of executing a batch job, and in particular, to a distributed batch processing system.

The whole or part of the exemplary embodiments disclosed above can be described as, but not limited to, the following supplementary notes.

(Supplementary Note 1)

A batch processing system comprising:
a first computer that executes a batch job;
a storing device that stores an execution status of the batch job executed in the first computer; and
a second computer connected with the first computer and the storing device, wherein the second computer includes:
a detection unit that detects performance of processing to record the execution status of the batch job on the storing device;
a selection unit that, according to the detected performance, selects a recording method to be used by the first computer from among a plurality of types of recording methods for recording the execution status of the batch job on the storing device; and
a notification unit that notifies the first computer of the selected recording method, and the first computer includes
an execution status recording unit that records the execution status of the batch job executed in the own computer on the storing device, using the recording method notified from the second computer.

(Supplementary Note 2)

The batch processing system, according to supplementary note 1, wherein
the plurality of the recording methods are different in access frequency to the storing device from each other.

(Supplementary Note 3)

The batch processing system, according to supplementary note 1 or 2, wherein
the second computer further includes
an attribute storing unit that stores an attribute of the batch job executed by the first computer, and
the selection unit selects the recording method for each of the first computers, according to the detected performance and the attribute of the batch job stored in the attribute storing unit.

(Supplementary Note 4)

The batch processing system, according to supplementary note 1 or 2, wherein
the first computer further includes
an execution state notification unit that notifies the second computer of an execution state of the batch job executed in the own computer,
the second computer further includes
an execution state storing unit that stores the execution state of the batch job notified from the first computer, and
the selection unit selects the recording method for each of the first computers, according to the detected performance and the execution state of the batch job stored in the execution state storing unit.

(Supplementary Note 5)

The batch processing system, according to supplementary note 1 or 2, wherein
the first computer further includes
an execution state notification unit that notifies the second computer of an execution state of the batch job executed in the own computer,
the second computer further includes
an attribute and execution state storing unit that stores an attribute of the batch job executed by the first computer and the execution state of the batch job notified from the first computer, and
the selection unit selects the recording method for each of the first computers, according to the detected performance, and the attribute of the batch job and the execution state of the batch job stored in the attribute and execution state storing unit.

(Supplementary Note 6)

The batch processing system, according to any of supplementary notes 1 to 5, including a plurality of the first computers.

(Supplementary Note 7)

A batch processing system control method that is a control method performed by a batch processing system including a first computer that executes a batch job, a storing device that stores an execution status of the batch job executed in the first computer, and a second computer connected with the first computer and the storing device, the method comprising:
by the second computer, detecting performance of processing to record an execution status of the batch job on the storing device;
by the second computer, according to the detected performance, selecting a recording method to be used by the first computer from among a plurality of types of recording methods for recording the execution status of the batch job on the storing device;
by the second computer, notifying the first computer of the selected recording method; and
by the first computer, recording the execution status of the batch job executed in the own computer on the storing device, using the recording method notified from the second computer.

(Supplementary Note 8)

The batch processing system control method, according to supplementary note 7, wherein
the plurality of the recording methods are different in access frequency to the storing device from each other.

(Supplementary Note 9)

The batch processing system control method, according to supplementary note 7 or 8, wherein
the selecting the recording method by the second computer includes selecting the recording method for each of the first computers, according to the detected performance and an attribute of the batch job executed by the first computer.

(Supplementary Note 10)

The batch processing system control method, according to supplementary note 7 or 8, further comprising
by the first computer, notifying the second computer of an execution state of the batch job executed in the own computer, wherein
the selecting the recording method by the second computer includes selecting the recording method for each of the first computers, according to the detected performance and the notified execution state of the batch job.

(Supplementary Note 11)

The batch processing system control method, according to supplementary note 7 or 8, further comprising
by the first computer, notifying the second computer of an execution state of the batch job executed in the own computer, wherein
the selecting the recording method by the second computer includes selecting the recording method for each of the first computers, according to the detected performance, an attribute of the batch job executed by the first computer, and the execution state of the batch job notified from the first computer.

(Supplementary Note 12)

A computer connected with a first computer that executes a batch job and a storing device that stores an execution status of the batch job executed in the first computer, the computer comprising:
a detection unit that detects performance of processing to record an execution status of the batch job on the storing device;
a selection unit that, according to the detected performance, selects a recording method to be used by the first computer from among a plurality of types of recording methods for recording the execution status of the batch job on the storing device; and
a notification unit that notifies the first computer of the selected recording method.

(Supplementary Note 13)

The computer, according to supplementary note 12, wherein
the plurality of the recording methods are different in access frequency to the storing device from each other.

(Supplementary Note 14)

The computer, according to supplementary note 12 or 13, further comprising an attribute storing unit that stores an attribute of the batch job executed by the first computer, wherein the selection unit selects the recording method for each of the first computers, according to the detected performance and the attribute of the batch job stored in the attribute storing unit.

(Supplementary Note 15)

The computer, according to supplementary note 12 or 13, further comprising an execution state storing unit that stores an execution state of the batch job notified from the first computer, wherein the selection unit selects the recording method for each of the first computers, according to the detected performance and the execution state of the batch job stored in the execution state storing unit.

(Supplementary Note 16)

The computer, according to supplementary note 12 or 13, further comprising an attribute and execution state storing unit that stores an attribute of the batch job executed by the first computer and an execution state of the batch job notified from the first computer, wherein the selection unit selects the recording method for each of the first computers, according to the detected performance, and the attribute of the batch job and the execution state of the batch job stored in the attribute and execution state storing unit.

(Supplementary Note 17)

A non-transitory computer-readable medium storing a program comprising instructions for causing a computer to function as, the computer being connected with a first computer that executes a batch job and a storing device that stores an execution status of the batch job executed in the first computer:

a detection unit that detects performance of processing to record an execution status of the batch job on the storing device;

a selection unit that, according to the detected performance, selects a recording method to be used by the first computer from among a plurality of types of recording methods for recording the execution status of the batch job on the storing device; and a notification unit that notifies the first computer of the selected recording method.

(Supplementary Note 18)

The non-transitory computer-readable medium storing the program according to supplementary note 17, wherein the plurality of the recording methods are different in access frequency to the storing device from each other.

(Supplementary Note 19)

The non-transitory computer-readable medium storing the program according to supplementary note 17 or 18, wherein the selection unit selects the recording method for each of the first computers, according to the detected performance and an attribute of the batch job executed by the first computer.

(Supplementary Note 20)

The non-transitory computer-readable medium storing the program according to supplementary note 17 or 18, wherein the program further comprises an instruction for causing the computer to function as an execution state storing unit that stores an execution state of the batch job notified from the first computer, and the selection unit selects the recording method for each of the first computers, according to the detected performance and the execution state of the batch job notified from the first computer.

(Supplementary Note 21)

The non-transitory computer-readable medium storing the program according to supplementary note 17 or 18, wherein the program further comprises an instruction for causing the computer to function as an attribute and execution state storing unit that stores an attribute of the batch job executed by the first computer and an execution state of the batch job notified from the first computer, and the selection unit selects the recording method for each of the first computers, according to the detected performance, the attribute of the batch job executed by the first computer, and the execution state of the batch job notified from the first computer.

The invention claimed is:

1. A batch processing system comprising:
   a first computer that executes a batch job;
   a storing device configured to store an execution status of the batch job; and
   a second computer communicatively connected with the first computer and the storing device,
   wherein the second computer includes:
      a detection unit configured to detect performance of the first computer in recording the execution status of the batch job on the storing device and compare a currently detected execution status recording performance with a previously detected execution status recording performance;
      a selection unit configured to select, based on a result of the comparing by the detection unit, a recording method to be used by the first computer from among a plurality of recording methods for recording the execution status of the batch job on the storing device; and
      a notification unit configured to notify the first computer of the selected recording method, and
   the first computer includes
      an execution status recording unit configured to record the execution status of the batch job using the selected recording method.

2. The batch processing system according to claim 1, wherein each of the plurality of recording methods uses a different frequency to access the storing device.

3. The batch processing system according to claim 1, wherein the second computer further includes:
   an attribute storing unit configured to store an attribute of the batch job,
   wherein the selection unit is further configured to select the recording method based on the result of the comparing by the detection unit and the attribute of the batch job.

4. The batch processing system according to claim 1, wherein:
   the first computer further includes an execution state notification unit configured to notify the second computer of an execution state of the batch job, and
   the second computer further includes an execution state storing unit configured to store the execution state of the batch job,
   wherein the selection unit is further configured to select the recording method based on the result of the comparing by the detection unit and the execution state of the batch job.

5. The batch processing system according to claim 1, wherein:
- the first computer further includes an execution state notification unit configured to notify the second computer of an execution state of the batch job, and
- the second computer further includes an attribute and execution state storing unit configured to store an attribute of the batch job and the execution state of the batch job,
- wherein the selection unit is further configured to select the recording method based on the result of the comparing by the detection unit, and the attribute and the execution state of the batch job.

6. The batch processing system according to claim 1, wherein the first computer is one of a plurality of computers executing the batch job.

7. A method for controlling a batch processing system, wherein the system includes a first computer configured to execute a batch job, a storing device configured to store an execution status of the batch job, and a second computer communicatively connected with the first computer and the storing device, the method comprising:
- detecting, by the second computer, a performance of the first computer in recording the execution status of the batch job on the storing device and comparing a currently detected execution status recording performance with a previously detected execution status recording performance;
- selecting, by the second computer, based on a result of the comparing, a recording method to be used by the first computer from among a plurality of recording methods for recording the execution status of the batch job on the storing device;
- notifying, by the second computer, the first computer of the selected recording method; and
- recording, by the first computer, the execution status using the selected recording method.

8. The method according to claim 7, wherein each of the plurality of recording methods uses a different frequency to access the storing device.

9. The method according to claim 7, wherein selecting the recording method by the second computer comprises:
- selecting the recording method based on the result of the comparing and an attribute of the batch job.

10. The method according to claim 7, further comprising:
- notifying, by the first computer, the second computer of an execution state of the batch job,
- wherein selecting the recording method by the second computer includes selecting the recording method based on the result of the comparing and the notified execution state of the batch job.

11. The method according to claim 7, further comprising:
- notifying, by the first computer, the second computer of an execution state of the batch job,
- wherein selecting the recording method by the second computer includes selecting the recording method based on the result of the comparing an attribute of the batch job, and the execution state of the batch job.

12. A second computer communicatively connected with a first computer configured to execute a batch job and a storing device configured to store an execution status of the batch job, the computer comprising:
- a detection unit configured to detect a performance of the first computer in recording the execution status of the batch job on the storing device and compare a currently detected execution status recording performance with a previously detected execution status recording performance;
- a selection unit configured to select, based on a result of the comparing by the detection unit, a recording method to be used by the first computer from among a plurality of recording methods for recording the execution status of the batch job on the storing device; and
- a notification unit configured to notify the first computer of the selected recording method.

13. The second computer according to claim 12, wherein each of the plurality of recording methods uses a different frequency to access the storing device.

14. The second computer according to claim 12, further comprising:
- an attribute storing unit configured to store an attribute of the batch job,
- wherein the selection unit is further-configured to select the recording method based on the result of the comparing by the detection unit and the attribute of the batch job.

15. The second computer according to claim 12, further comprising
- an execution state storing unit configured to store an execution state of the batch job notified by the first computer,
- wherein the selection unit is further configured to select the recording method based on the result of the comparing by the detection unit and the execution state of the batch job.

16. The second computer according to claim 12, further comprising
- an attribute and execution state storing unit configured to store an attribute and an execution state of the batch job, the execution state being notified by the first computer,
- wherein the selection unit is further configured to select the recording method based on the result of the comparing by the detection unit, and the attribute and the execution state of the batch job.

17. The batch processing system according to claim 1, wherein the execution status comprises at least one of an active status and an inactive status.

18. The batch processing system according to claim 3, wherein the attribute of the batch job comprises a quantity of data.

19. The batch processing system according to claim 4, wherein the execution state comprises at least one of a time of executing the batch job, a number of accesses to the storing device while executing the batch job, and a rate of accessing the storing device while executing the batch job.

20. The method according to claim 7, wherein the execution status comprises at least one of an active status and an inactive status.

21. The method according to claim 9, wherein the attribute of the batch job comprises a quantity of data.

22. The method according to claim 10, wherein the execution state comprises at least one of a time of executing the batch job, a number of accesses to the storing device while executing the batch job, and a rate of accessing the storing device while executing the batch job.

23. The second computer according to claim 12, wherein the execution status comprises at least one of an active status and an inactive status.

24. The second computer according to claim 14, wherein the attribute of the batch job comprises a quantity of data.

25. The second computer according to claim 15, wherein the execution state comprises at least one of a time of executing the batch job, a number of accesses to the storing device while executing the batch job, and a rate of accessing the storing device while executing the batch job.

* * * * *